(12) United States Patent
Concil et al.

(10) Patent No.: US 7,975,210 B2
(45) Date of Patent: Jul. 5, 2011

(54) TRANSMITTER/RECEIVER SYSTEM WITH EFFICIENT MEMORY MANAGEMENT IN RATE MATCHING PROCESSES

(75) Inventors: Andrea Concil, Novara (IT); Andrea Giorgi, Busto Arsizio (IT); Rizziero Gorla, Magnago (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 1164 days.

(21) Appl. No.: 11/712,595

(22) Filed: Feb. 27, 2007

(65) Prior Publication Data

US 2008/0205346 A1    Aug. 28, 2008

(30) Foreign Application Priority Data

Feb. 27, 2006    (EP) .................................... 06110453

(51) Int. Cl.
*H03M 13/03*    (2006.01)
(52) U.S. Cl. ...................................................... 714/790
(58) Field of Classification Search ................. 714/746, 714/763, 790; 370/232, 335, 403
See application file for complete search history.

(56) References Cited

U.S. PATENT DOCUMENTS

| | | | | |
|---|---|---|---|---|
| 6,510,137 | B1 * | 1/2003 | Belaiche | 370/232 |
| 6,996,114 | B2 * | 2/2006 | Sebire | 370/403 |
| 7,372,837 | B2 | 5/2008 | Kinjo et al. | |

FOREIGN PATENT DOCUMENTS

EP    1 324 528 A    7/2003

OTHER PUBLICATIONS

Rapeepat Ratasuk, et al., "Performance Analysis of Time-Multiplexed Services for UMTS W-CDMA Reverse Link", IEEE 2002, pp. 1607-1611.
Dai Lin, et al., "A new implementation algorithm for multiplexing and channel coding scheme in WCDMA", IEEE 2000, pp. 1685-1688.
3GPP TS 25.222 V3.10.0 (Sep. 2002) Techical Specification, $3^{rd}$ Generation Partnership Project; Technical Specification Group Radio Access Network; Multiplexing and channel coding (TDD) (Release 1999), 2002, 3GPP Organizational Partners.
3GPP TS 25.212 V3.11.0 (Sep. 2002) Techical Specification, 3rd Generation Partnership Project; Technical Specification Group Radio Access Network; Multiplexing and channel coding (FDD) (Release 1999), 2002, 3GPP Organizational Partners.
European Search Report for EP 06 11 0453 dated Apr. 25, 2006.

* cited by examiner

*Primary Examiner* — Shelly A Chase
(74) *Attorney, Agent, or Firm* — Lisa K. Jorgenson; Kevin D. Jablonski; Graybeal Jackson LLP

(57)    ABSTRACT

An embodiment of a telecommunications device includes means for providing a set of words, each word including a plurality of digital symbols; a first memory area for storing the set of words, the first memory area including a first sequence of memory locations each one for storing a symbol; a second memory area for storing a composite frame including a predetermined number of symbols, the second memory area including a second sequence of memory locations; conversion means for converting the set of words in the first memory area into the frame in the second memory area, the conversion means including reduction means for reducing each word by removing a set of symbols from the word according to a puncturing algorithm, and expansion means for expanding each word by adding a set of additional symbols to the word according to a repeating algorithm; and means for transmitting the frame.

12 Claims, 6 Drawing Sheets

TRANSMITTER/RECEIVER SYSTEM WITH EFFICIENT MEMORY MANAGEMENT IN RATE MATCHING PROCESSES

PRIORITY CLAIM

This application claims priority from European patent application No. EP06110453.5, filed Feb. 27, 2006, which is incorporated herein by reference.

TECHNICAL FIELD

An embodiment of the present invention relates to the telecommunication field; more specifically, an embodiment of the present invention relates to transmitter/receiver devices.

BACKGROUND

In the present times, telecommunication systems manage the transmission of huge flows of information with great flexibility. Moreover, current telecommunication systems have the capability of handling multiple multimedia services (such as voice, video and text signals) in a simultaneous way, as in the case of the well known Universal Mobile Telecommunications System (UMTS) standard. For this purpose, a typical approach provides for time-multiplexing said multiple and simultaneous services together onto a single physical channel. Moreover, channel coding schemes are applied to protect the flow of information from corruption effects caused by fading channels. According to said channel coding schemes, an increased quantity of data is delivered to the physical channel even if its bandwidth is limited by regulatory bodies due to spectrum limitations. At this level it is therefore often necessary to adapt the encoded data rate to the rate available at the physical level, trying to maintain a certain Quality of Service (QoS), as required by the nature itself of the service. This functionality is provided by the so called "rate matching" process by which each service is treated separately in order to "match" the throughput adaptation and the QoS compliance. More particularly, the rate matching is a coordinate process that matches the bits of the data flows associated with the different services to the bits available on the physical channel during each transmission period. This is achieved through removal and/or addition of bits carried out following predetermined pattern algorithms.

The operations performed during the rate matching process on the bits of the various data flows often require the use of memory devices. More particularly, the removal and/or the addition of bits from/to each data flow includes a plurality of steps, usually accomplished through multiple and dedicated memory areas. In detail, before the rate matching operations are performed on the various data flows, a first memory area is typically used for storing the bits thereof; the rate matching operations are then performed on copies of said bits stored in further memory areas, each one being adapted to store the intermediate results of a particular step of the rate matching process.

However, this approach is often not optimal, particularly for portable telecommunications apparatuses. Indeed, the use of multiple memory areas may be excessively expensive, both in terms of occupied silicon area and electric power consumption. The presence of multiple dedicated memory areas also requires a complex management thereof. For example, at each step of the rate matching process, bits have to be copied to a further memory area. All these copying operations involve processing periods that are relatively short. However, when the number of data flows is high, and when each data flow has a high bit rate, the total time required for performing all the copying operations may be intolerable.

SUMMARY

In principle, an embodiment of the present invention proposes a solution for the implementation of the rate matching process within a reduced memory space.

Particularly, an embodiment of the present invention provides a telecommunication transmitter device. The transmitter device includes means for providing a set of words; each word includes a plurality of digital symbols. A first memory area is used for storing the set of words; the first memory area includes a first sequence of memory locations each one for storing a symbol. The transmitter device further includes a second memory area for storing a composite frame includes a predetermined number of symbols; the second memory area includes a second sequence of memory locations. The transmitter device then includes conversion means for converting the set of words in the first memory area into the frame in the second memory area; the conversion means includes reduction means for reducing each word by removing a set of symbols from the word according to a puncturing algorithm, and expansion means for expanding each word by adding a set of additional symbols to the word according to a repeating algorithm. The transmitter device further includes means for transmitting the frame. The first memory area and the second memory area have at least one memory location in common.

A further embodiment of the present invention provides a telecommunication receiver device. The receiver device includes means for receiving a composite frame including a predetermined number of symbols; the frame includes a set of words each one consisting of a plurality of digital symbols. A first memory area is used for storing the frame; the first memory area includes a first sequence of memory locations each one for storing a symbol. The receiver device further includes a second memory area for storing a set of converted words corresponding to said words; the second memory area includes a second sequence of memory locations. The receiver device then includes conversion means for converting the set of words in the first memory area into the set of converted words in the second memory area; the conversion means includes reduction means for reducing each word by removing a set of symbols from the word according to a puncturing algorithm, and expansion means for expanding each word by adding a set of additional symbols to the word according to a repeating algorithm. The receiver device further includes means for outputting the set of converted words. The first memory area and the second memory area have at least one memory location in common.

The two memory areas may be aligned and one of them may be included within the other.

Typically, the reduction of the words is obtained by shifting subsets of their symbols.

In an embodiment of the invention, each subset includes the symbols comprised between two symbols to be reduced.

Likewise, the expansion of the words as well is obtained by shifting subsets of their symbols.

In a further embodiment, each shifting operation creates the free locations for all the additional symbols that are still to be inserted.

Typically, the proposed solution applies to multiple words.

In this case, it may be preferable to reduce the words individually and hence compact them.

Vice versa, the words may be written directly separated and then expanded.

Another embodiment of the present invention provides a telecommunication apparatus including said transmitter device and said receiver device.

Further embodiments of the present invention provide a corresponding method for controlling a transmitter device and a corresponding method for controlling a receiver device.

BRIEF DESCRIPTION OF THE DRAWINGS

Features and advantages of one or more embodiments of the invention will be best understood by reference to the following detailed description, given purely by way of a non-restrictive indication, to be read in conjunction with the accompanying drawings.

DETAILED DESCRIPTION

Figure 1:
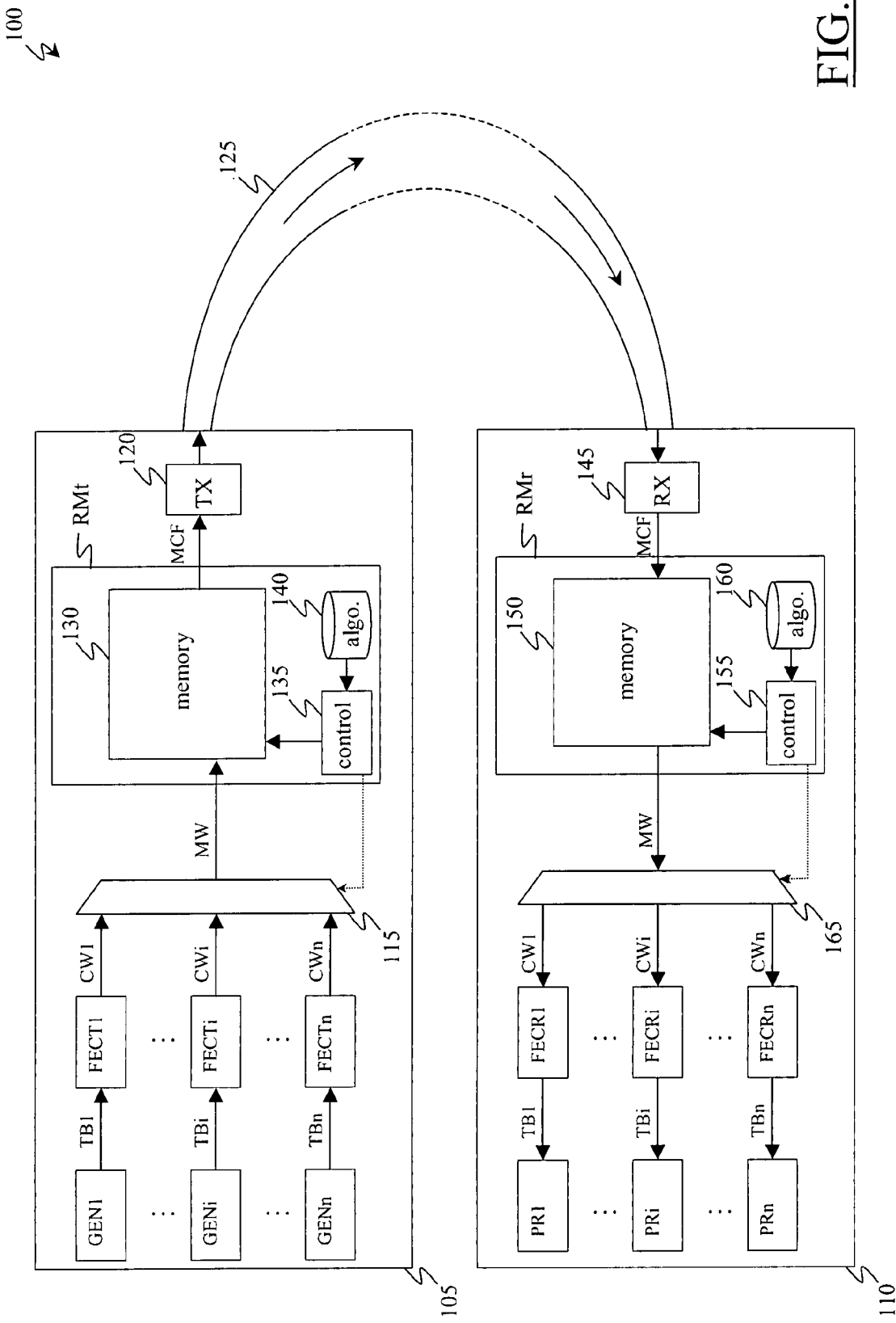
FIG. 1 is a block diagram of a transmitter/receiver system, according to an embodiment of the present invention.

With reference to the drawings, in FIG. 1 a simplified and generic functional block diagram of a transmitter/receiver system 100 is schematically illustrated according to an embodiment of the present invention. The system 100 may be, for example, adapted to manage the operations required for offering telecommunication multimedia services, such as in the case of the UMTS.

The system 100 comprises a transmitter device 105 and a receiver device 110. The transmitter device 105 includes n generator blocks GENi (i=1 to n), each one providing a corresponding service data stream. Each service data stream is formed by a sequence of transport blocks TBi, each one including a number of digital bits to be transmitted to the receiver device 110. The multiple service data streams provide different information that is to be managed concurrently in a typical multimedia service. For example, the transport blocks TBi of a service data stream may convey a digitalized audio signal, while the transport blocks TBi of another service data stream may convey a digitalized video signal, in such a way to serve a video telephone call. Moreover, further service data streams may be dedicated to serve a Short Message Service (SMS), an electronic mail service, and the like.

Each generator block GENi is connected to a corresponding encoding block FECTi to feed the transport blocks TBi thereto. The encoding block FECTi is adapted to perform Forward Error Correction (FEC) operations in such a way that each transport block TBi is converted into a coded digital word CWi for error detection and correction. The encoding block FECTi is characterized by a fixed coding rate, i.e., the ratio between the number of bits of the received transport blocks TBi and the number of bits $m_i$ of the corresponding coded digital words CWi is constant.

All the encoding blocks FECTi are connected to a rate matching block RMt by means of a multiplexer 115. More particularly, the multiplexer 115 comprises n inputs, each one connected to an encoding FECTi for receiving the corresponding coded digital words CWi, and an output connected to the rate matching block RMt. The coded digital words CWi generated by each encoding block FECTi are concurrently provided to the multiplexer 115, which passes them serially to the rate matching block RMt. Particularly, during a predetermined period of time, called "transmission time interval" TTINT, the multiplexer 115 supplies a multiplexed digital word MW being formed by the sequence of the n coded digital words CW1, . . . CWi, . . . CWn (from the different encoding blocks FECTi).

The rate matching block RMt converts the multiplexed digital word MW into a matched composite frame MCF, which is provided to a transmission block 120. The transmission block 120 transmits the matched composite frame MCF via a dedicated physical channel 125, for example, a telephone cable or the atmosphere. More in detail, the rate matching block RMt modifies the number of bits of each coded digital word CWi included in the multiplexed digital word MW in such a way to ensure that the number of bits of the resulting matched composite frame MCF is equal to a predetermined number ANB suitable to the transmission (i.e., the number of bits that can be transmitted on the physical channel 125 during the transmission time interval TTINT).

For this purpose, the rate matching block RMt includes a memory 130 having a plurality of locations (not shown in the figure), each one adapted to store a bit. A dedicated area of the memory 130 is used to receive the multiplexed digital word MW from the multiplexer 115. The rate matching block RMt further includes a controller 135 that manages the operations needed to modify the multiplexed digital word MW, according to instructions stored in a dedicated memory 140. More particularly, those operations include the removal and/or the addition of bits from/to the coded digital words CWi of the multiplexed digital word MW. The removal of bits from the coded digital words CWi is performed following a predetermined "puncturing" algorithm, while the addition of bits to the coded digital words CWi is performed following a predetermined "repeating" algorithm. The bits to be removed from coded digital words CWi are chosen in such a way to preserve the significant information stored therein. For example, according to a typical puncturing algorithm, only some of the encoded bits may be removed, i.e., those carrying non systematic information. In any case, the error detection and correction capability of the transmission is decreased. Conversely, the addition of bits to the coded digital words CWi is typically performed by repeating some of the bits already included therein. This adds further redundancy, so that the error detection and correction capability of the transmission is increased.

The rate matching block RMt allows managing the transmission of multiple service data streams in a flexible and efficient way, because it is capable of acting on each coded digital word CWi forming the multiplexed digital word MW in a different way. In fact, if one service data stream (e.g., the one carrying the audio signal in a telephone call) is more important than the others, the rate matching block RMt may advantageously adds bits to the corresponding coded digital words CWi, thereby increasing its error detection and correction capability (i.e., its QoS). Naturally, the prioritizing of one service data stream implies the removal of bits (and so, the reduction of the error detection and correction capability) from the coded digital words CWi of one or more of the other service data streams, because of the constraint given by the allowed number of bits ANB of the matched composite frame MCF.

The matched composite frame MCF is stored into an area of the memory 130, which is accessed by the transmission block 120. As described in detail in the following, according to an embodiment of the present invention said area is included in (i.e., its locations are all also location of) the area storing the multiplexed digital word MW, or vice versa. The matched composite frame MCF is then obtained from the multiplexed digital word MW by simply shifting its bits within the above-mentioned common area of the memory 130.

The receiver device 110 has a dual structure with respect to the transmitter device 105.

Briefly, the receiver device 110 includes a receiving block 145 that supplies the matched composite frame MCF to a rate matching block RMr. The rate matching block RMr is adapted to perform the reverse task of the rate matching block RMt included in the transmitter device 105, i.e., retrieving the multiplexed digital word MW from the matched composite frame MCF. The rate matching block RMr includes a memory 150; as in the preceding case, a common area of the memory 150 is used to store both the matched composite frame MCF and the multiplexed digital word MW (with the multiplexed digital word MW that is obtained from the matched composite frame MCF by shifting its bits). The rate matching block RMr further includes a controller 155 that manages the operations needed to modify the matched composite frame MCF following instructions stored in a dedicated memory 160.

The operations for converting the matched composite frame MCF into the multiplexed digital word MW include removal and/or addition of bits depending on the operations performed by the transmitter device 105 prior to the transmission of the matched composite frame MCF. More particularly, if the rate matching block RMt of the transmitter device 105 has reduced the number of bits of the coded digital words CWi forming the multiplexed digital word MW, the rate matching block RMr adds bits to the received matched composite frame MCF according to a "de-puncturing" algorithm so as to restore the multiplexed digital word MW. If instead the rate matching block RMt of the transmitter device 105 has increased the number of bits of the coded digital words CWi forming the multiplexed digital word MW, the rate matching block RMr removes bits from the received matched composite frame MCF according to a "de-repeating" algorithm so as to restore the multiplexed digital word MW.

The multiplexed digital word MW is provided to a demultiplexer 165, which is connected to n decoding blocks FECRi (i=1 to n). The demultiplexer 165 divides the multiplexed digital word MW so as to re-obtain the coded digital words CWi included therein, and provides them to the corresponding decoding blocks FECRi.

The decoding blocks FECRi perform FEC operations, in order to reconstruct the corresponding transport blocks TBi.

Each decoding block FECRi is connected to a corresponding processing block PRi, adapted to process the information conveyed by the received transport blocks TBi according to the particular use which it is designed for.

The rate matching process according to different embodiments of the invention will be now explained in detail. Even if the rate matching operations described in the following refer only to the transmission side, i.e., they refer to the operations performed by the controller 135 on the memory 130 in the transmitter device 105, similar considerations are applicable with reference to the operations performed by the controller 155 on the memory 150 in the receiver device 110. In fact, as previously pointed out, the de-puncturing algorithm is substantially equal to the repeating algorithm and the de-repeating algorithm is substantially equal to the puncturing algorithm.

Referring specifically to FIGS. 2A-2D, there are illustrated four exemplary rate matching processes that can be performed at the transmitter side according to corresponding embodiments of the present invention. More particularly, in all these cases the transmitter device manages a single-service data stream, so that the multiplexed digital word MW includes one coded digital word CW only (for the sake of simplicity, the index "i" will be omitted in the following).

Figure 2A:
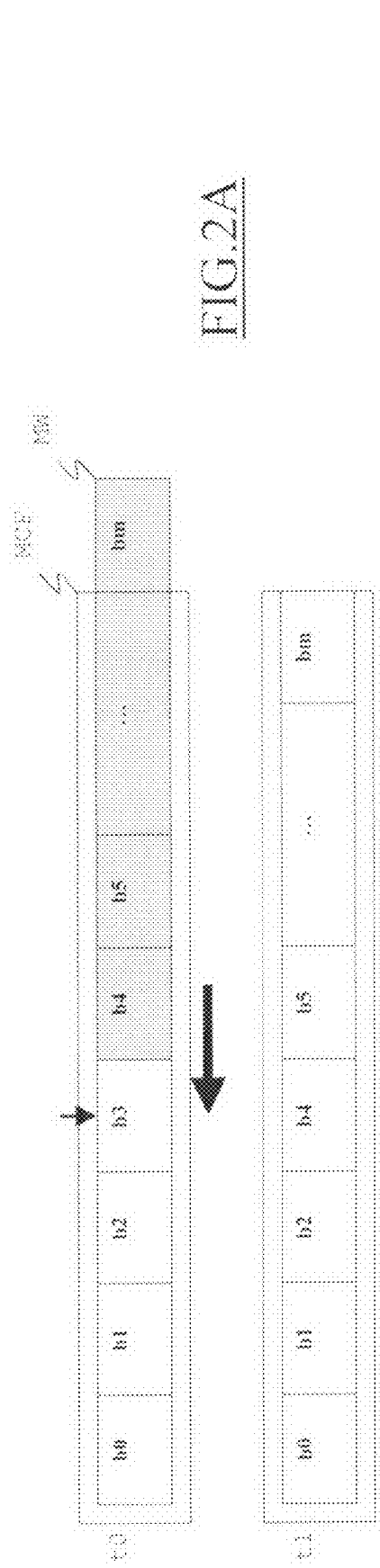
FIGS. 2A-2D illustrate four exemplary rate matching processes performed on a single service data stream according to various embodiments of the present invention.

FIG. 2A refers to a case in which the allowed number of bits ANB that can be transmitted on the physical channel is lower than the number of bits m of the coded digital word CW. At a time t0 the bits $b0, b1, \ldots, bm$ of the coded digital word CW are stored into adjacent locations of the rate matching memory. In this case, the rate matching block RMt removes one or more bits from the coded digital word CW, according to the puncturing algorithm. Assuming, for example, that the puncturing algorithm is based on a "bit-removal pattern" involving the removal of one bit every four bits, at the time t1 the bit b3 is removed. For this purpose, the following bits b4-bm are shifted to the left by a single location, in such a way that the bit b4 overwrites the bit b3, the bit b5 overwrites the bit b4, and so on, until bit bm overwrites the bit b(m−1). The same operations are repeated for any other bit to be removed. Taking as a starting reference the first bit of the coded digital word CW (i.e., the bit b0), according to this embodiment the operations for reducing the number of bits of the coded digital words CW include shift operations toward the starting reference. Therefore, in order to avoid erroneous overwriting of the bits, the bits are shifted by beginning from the bit nearest to the starting reference and proceeding until the end of the coded digital word CW.

Figure 2B:
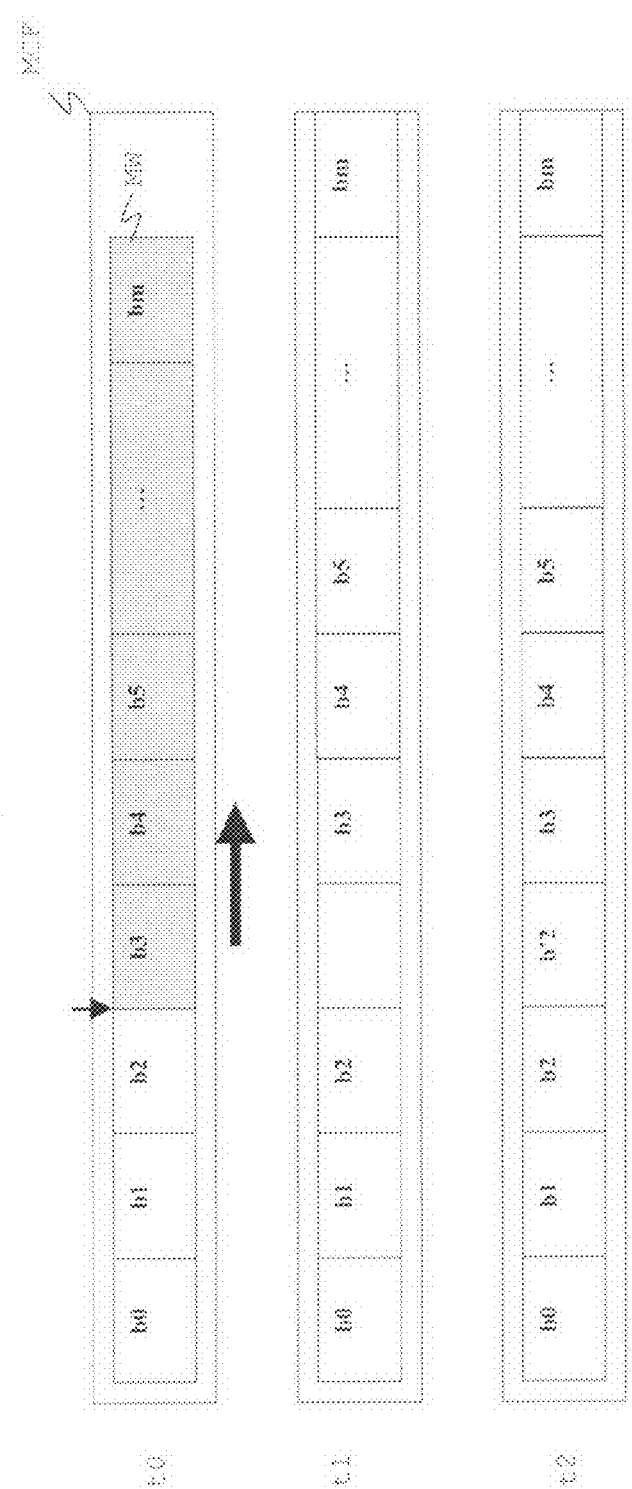

FIG. 2B refers instead to a case in which the allowed number of bits ANB is higher than the number of bits m of the coded digital word CW stored in the rate matching memory at the time t0. Therefore, the rate matching block RMt adds one or more bits to the coded digital word CW, according to the repeating algorithm. Assuming, for example, that the repeating algorithm is based on a "bit-repetition pattern" involving the repetition of a bit every three bits, at first the bit b2 of the coded digital word CW is repeated. For this purpose, at the time t1 the following bits b3-bm are shifted to the right by a single location, in such a way that the bit bm is copied into the location following the last location wherein the coded digital word CW was stored, the bit b(m−1) overwrites the bit bm, the bit b(m−2) overwrites the bit b(m−1) and so on, until the bit b3 overwrites the bit b4. This shifting operation creates a "free" location (depicted in the figure with a blank space) between the locations storing the bits b0-b2 and those storing the bits b3-bm. Afterward, at a time t2, a bit b'2 is inserted into the free location. If the repeating algorithm demands for the insertion of a copy of the bit b2 (i.e., b'2=b2), according to an embodiment of the present invention, the shifting operation performed at the time t1 advantageously acts on the bit b2 as well. In this way, a copy of the bit b2 is directly stored in the location wherein the bit b3 was stored at the time t0. The same operations are repeated for any other bit to be added. According to this embodiment, the operations for increasing the number of bits of the coded digital word CW include shift operations toward the end of the coded digital word CW, in such a way to generate free space(s) for allowing the insertion of the additional bit(s). Therefore, in order to avoid erroneous overwriting of the bits, the bits are shifted by starting from the end of the coded digital word CW and proceeding towards the starting reference.

Figure 2C:
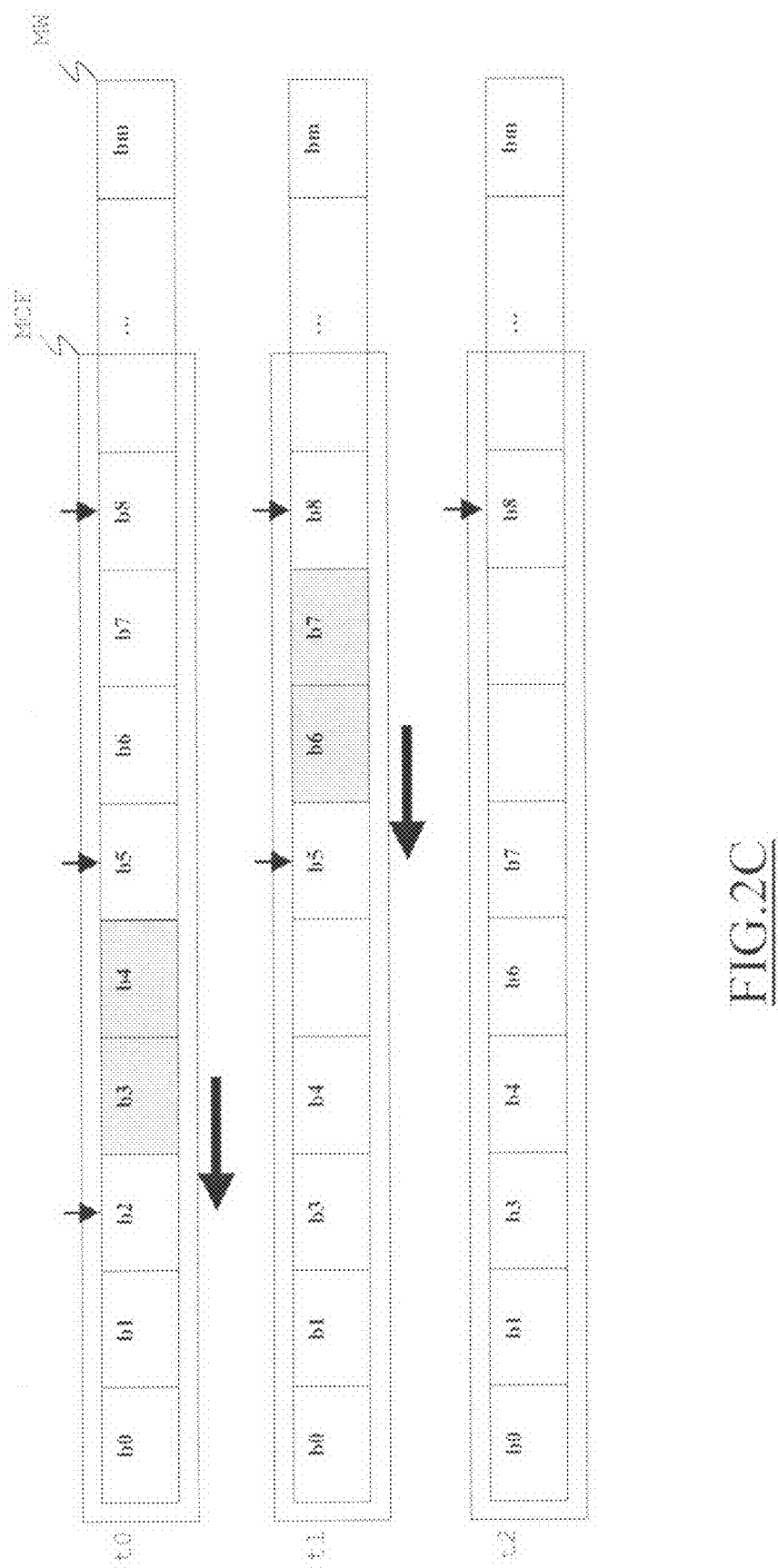

FIG. 2C refers to an alternative embodiment of the present invention regarding another case in which the allowed number of bits ANB is lower than the number of bits m of the coded digital word CW stored in the rate matching memory at the time t0. Assuming, for example, that the puncturing algorithm is based on a bit-removal pattern providing the removal of one bit every three bits, at the time t1 the bit b2 is removed. For this purpose, only the bits between the bit b2 and the next bit to be removed (in this case, the bit b5) are shifted to the left by a single location. Therefore, the bit b3 overwrites the bit b2, and the bit b4 overwrites the bit b3. This creates a free location between the locations storing the bits b0-b4 and those storing the bits b5-bm. Then, at the time t2, the bit b5 must be removed. For this purpose, the bits comprised between the bit b5 and the next bit to be removed (i.e., the bit b8) are now shifted to the left by a number of locations equal to the bits to be removed (in this case, one) plus the number of free locations present between the bit to be removed and the first bit (in this case, one). Consequently, the bit b6 overwrites the free location, and the bit b7 overwrites the bit b5. This creates two free locations between the locations storing the bits b0-b7 and those storing the bits b8-bm. The same operations are repeated for any other bit to be removed, with shifting operations involving displacement of a number of locations that progressively increases. As pointed out above, in order to avoid erroneous overwriting, the bits are shifted by beginning from the bit nearest to the starting reference and proceeding until the end of the coded digital word CW.

According to this embodiment, the number of shifting operations is advantageously kept as small as possible; indeed, each bit of the multiplexed digital word is now moved only one time, even when multiple bits are to be removed.

Figure 2D:
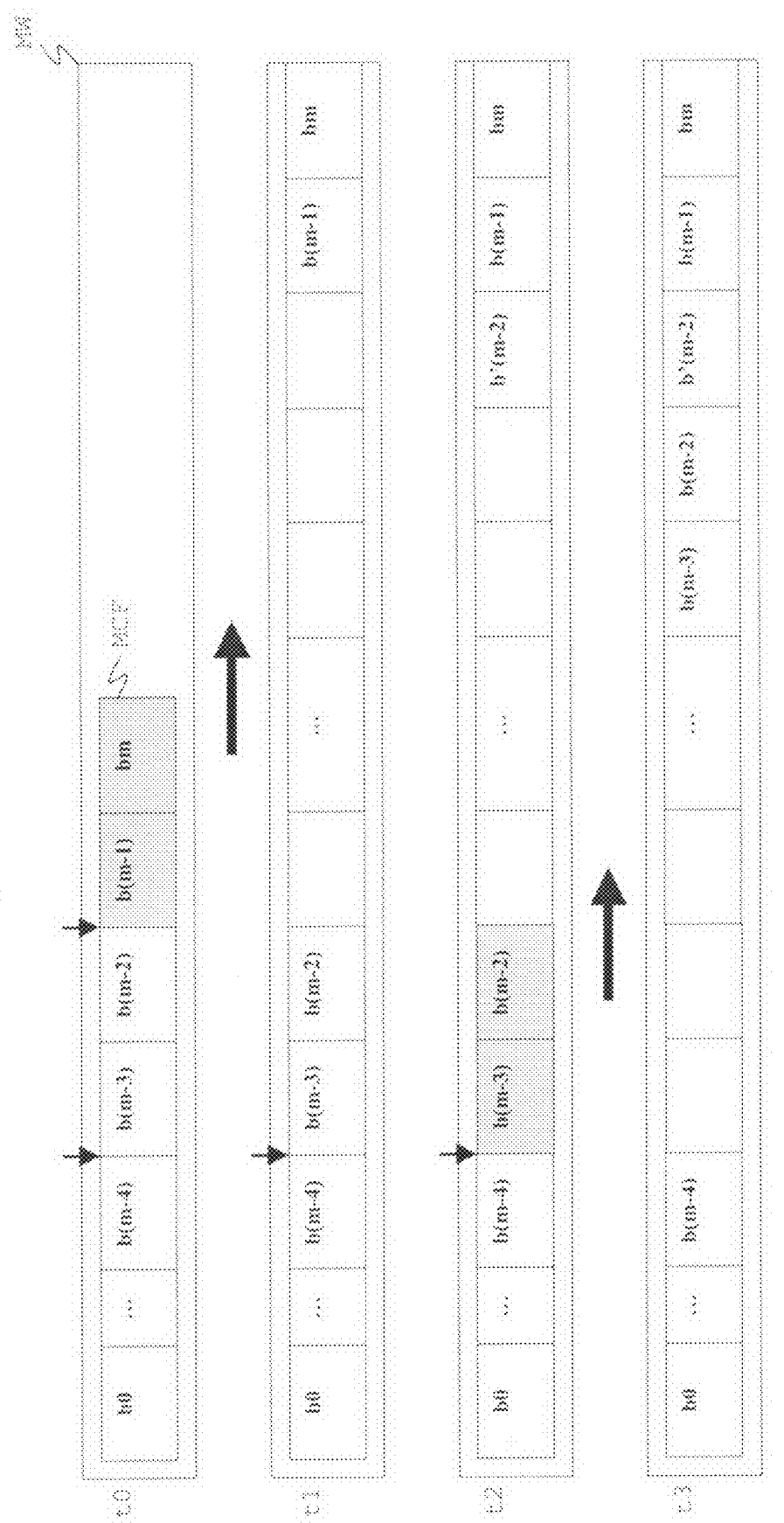

FIG. 2D refers instead to an alternative embodiment of the present invention regarding another case in which the allowed number of bits ANB is higher than the number of bits m of the coded digital word CW stored in the rate matching memory at the time t0. According to this embodiment, the insertion of additional bits starts from the right end (i.e., from the last bit) of the coded digital word CW. Assuming for example that the repeating algorithm is based on a bit-repetition pattern providing the repetition of a bit every two, and that the coded digital word CW includes an even number of bits b0-bm, at first the bit b(m−2) of the coded digital word CW has to be repeated. For this purpose, at the time t1 the following bits b(m−1) and bm are shifted to the right by a number of locations equal to the total number of bits to be repeated in the whole coded digital word CW, thereby creating an equal number of free locations between the locations storing the bits b0-b(m−2) and those storing the bits b(m−1)-bm. Afterward, at a time t2, a bit b'(m−2) is inserted into the free location adjacent to the bit b(m−1). Then, at a time t3, the bits comprised between the first free location and the next bit to be repeated (in this case, the bits b(m−3) and b(m−2)) are shifted to the right by a number of locations equal to the bits that are still to be inserted; as a result the bit b(m−2) is stored into the location adjacent to the one storing the bit b'(m−2). The same operations are repeated for any other bit to be added, with shifting operations involving displacement of a number of locations that progressively decreases. As pointed out above, in order to avoid erroneous overwriting of the bits, the bits are shifted by starting from the end of the coded digital word CWi and proceeding towards the starting reference.

According to this embodiment as well, the number of shifting operations is advantageously kept as small as possible, because each bit of the multiplexed digital word is moved only one time (even when multiple bits are to be repeated).

In the cases illustrated in the FIGS. 2A and 2C, i.e., when the number of bits of the coded digital word CW has to be reduced, the number of locations required for the rate matching process is equal to the initial number of locations occupied by the multiplexed digital word MW at the time t0; indeed, the process only includes shifting operations directed to reduce the number of the bits.

Conversely, in the cases illustrated in the FIGS. 2B and 2D, i.e., when the number of bits of the coded digital word CW has to be increased, the number of locations required for the rate matching process is equal to the final number of locations occupied by the matched composite frame MCF at the completion of the process; indeed, the process only includes shifting operations directed to increase the number of the bits.

In other words, according to an embodiment of the present invention, the number of locations required for performing the rate matching process is given by the highest between that of the multiplexed digital word MW and that of the matched composite frame MCF. Consequently, the memory space used during the rate match process is as small as possible. In fact, all the shifting operations are performed directly on the locations of the memory area in which the multiplexed digital word MW is stored. This approach is completely different from that used in the solutions known in the art, wherein a copy of the coded digital words CW is maintained stored in the memory during the entire process.

Thanks to this solution, the electric power consumption and the silicon area needed for the memory implementation are drastically reduced.

Moreover, this strongly simplifies the management of the memory; this has a beneficial impact on the performance of the whole system (especially when the number of data flows and/or the bit rates are very high).

Figure 3A:
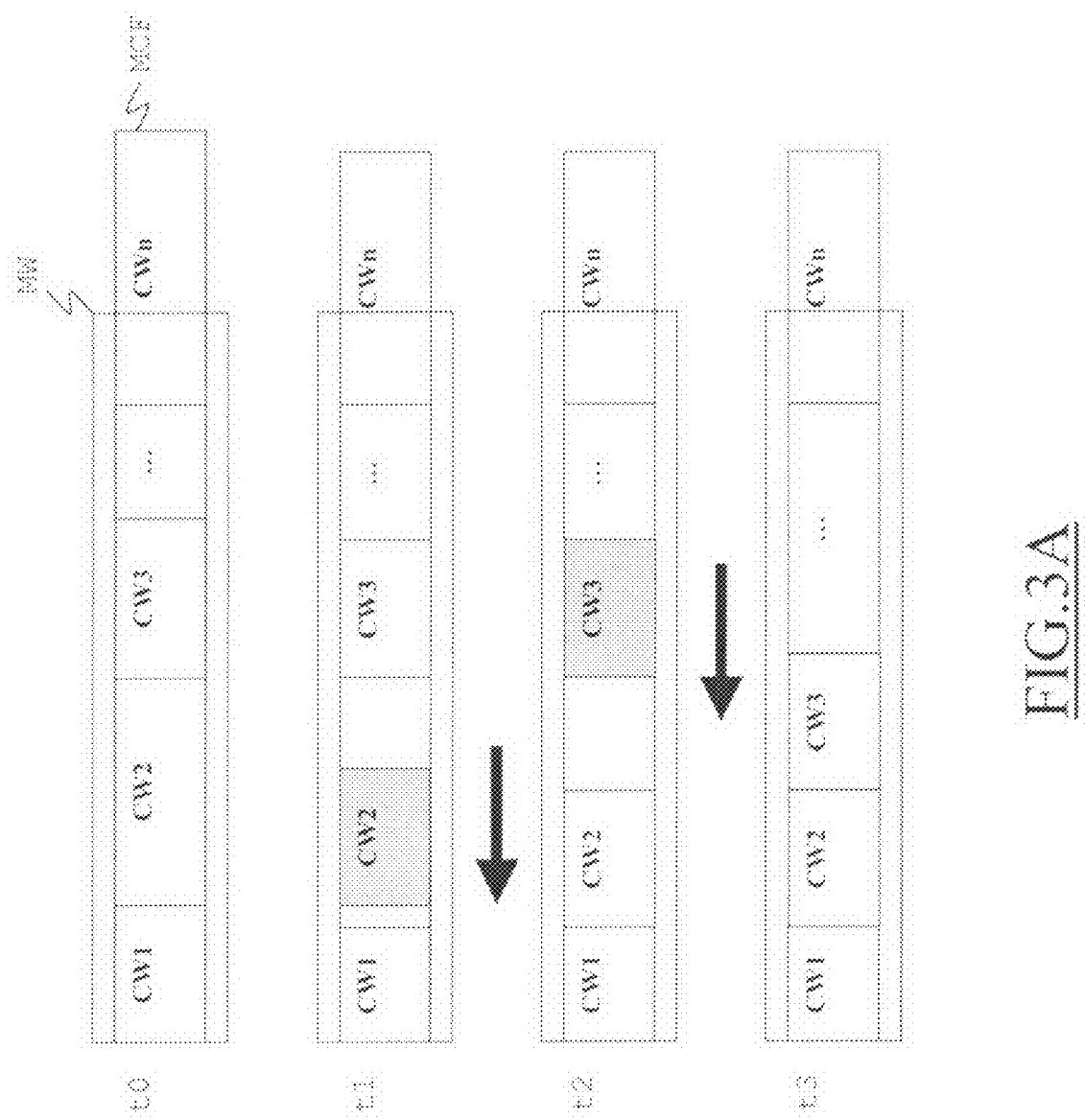
FIGS. 3A-3B illustrate two exemplary rate matching processes performed on multiple service data streams according to further embodiments of the present invention.
Figure 3B:
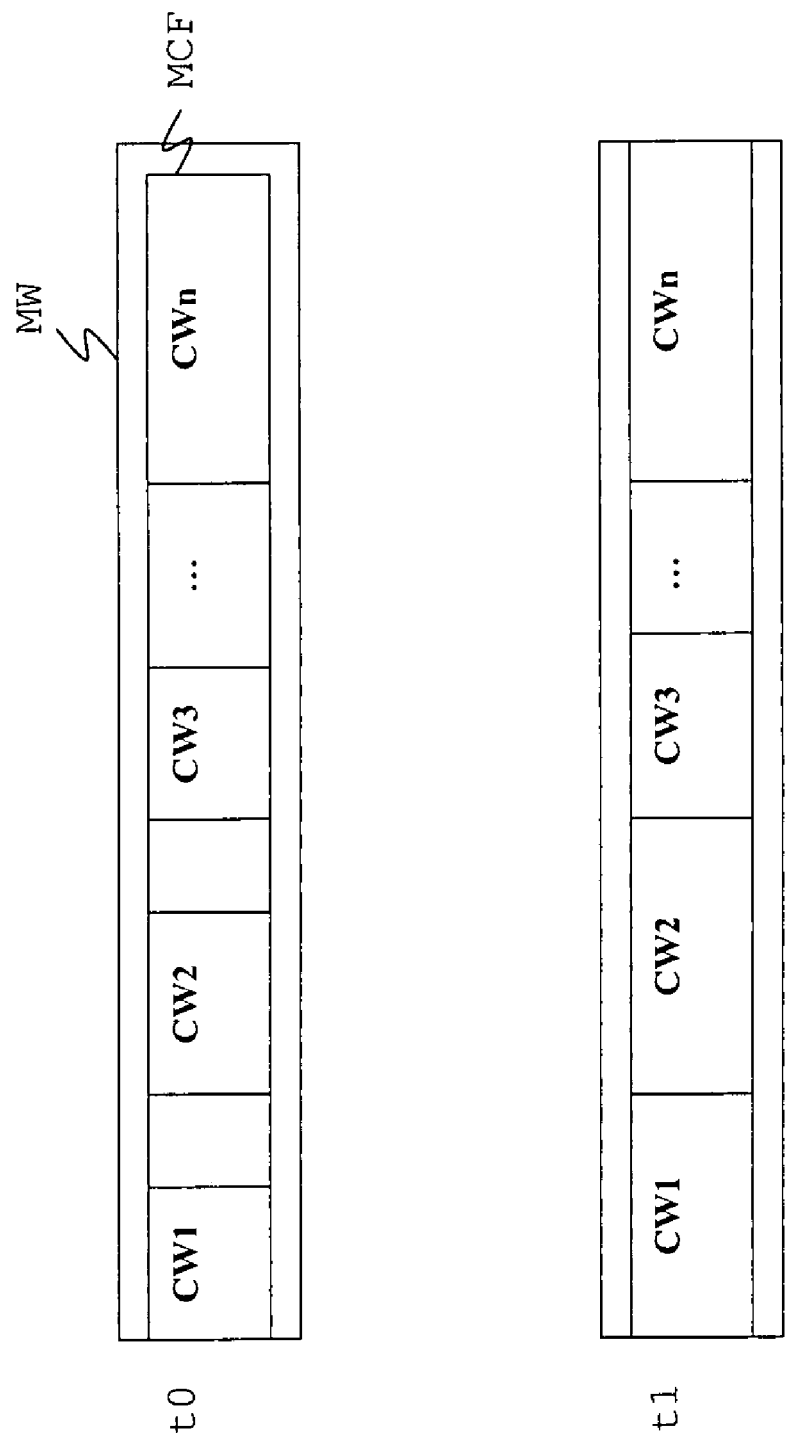

Referring now to FIGS. 3A and 3B, there are illustrated two exemplary rate matching processes that can be performed at the transmitter side according to other embodiments of the present invention. More particularly, in these two cases the transmitter device manages multiple service data streams, so that the multiplexed digital word MW includes n (>1) coded digital words CW1-CWn.

FIG. 3A refers to a case in which the allowed number of bits ANB that can be transmitted on the physical channel is lower than the number of bits forming the multiplexed digital word MW. In this case, the rate matching block RMt removes one or more bits from the multiplexed digital word MW, according to the puncturing algorithm. At the time t0 the multiplexed digital word MW is stored in such a way that its coded digital words CW1-CWn are arranged in succession into adjacent locations. At the time t1 the required bits are removed from each coded digital word CWi according to one of the embodiments previously described. Consequently, since in every coded digital word CWi of the multiplexed digital word MW the number of bits has been reduced, one or more free locations are created between each pair of adjacent (reduced) coded digital words CWi. Afterward, at the time t2, the coded digital word CW2 is shifted to the left by a number of locations equal to the number of free locations present between the coded digital words CW1 and CW2, in such a way that the first bit of the coded digital word CW2 is stored into a location adjacent to that wherein the last bit of the coded digital word CW1 is stored. In the same way, at the time t3, the coded digital word CW3 is shifted to the left by a number of locations equal to the number of free locations present between the coded digital words CW2 and CW3 (including both those given by the bits removed from the coded digital word CW2, and those given by the shifting of the coded digital word CW2 at the time t2). The same operations are repeated for the other coded digital words CWi, until all the free locations have been overwritten.

In the above described embodiment, the coded digital words CWi are at first reduced individually, and then compacted (even if, in a more efficient embodiment, these two operations can be performed in a single step). In this way, the number of required shifting operations is advantageously kept as small as possible (i.e. each bits is moved only once). As pointed out above, in this case as well the number of locations required for the rate matching process is equal to the initial number of locations occupied by the multiplexed digital word MW, because the process only includes shifting operations directed to reduce the number of the bits.

FIG. 3B refers to a case in which the allowed number of bits ANB that can be transmitted on the physical channel 125 is higher than the number of bits forming the multiplexed digital word MW. In this case, the rate matching block RMt adds one or more bits to the multiplexed digital word MW, according to the repeating algorithm. At the time t0 the coded digital words CWi of the multiplexed digital word MW are stored into the memory 130 in such a way that each pair of consecutive coded digital words CWi, CW(i+1) is separated by a number of free locations, equals to the bits to be added in the first coded digital word CWi of the pair according to the repeating algorithm. In this way, at the time t1, the required bit(s) can be added to each coded digital word CWi according to one of the embodiments previously described, avoiding any risk of erroneous bit overwriting, because of the presence of the correct number of free locations.

In this embodiment, the coded digital words CWi are at first separated and then expanded individually; in this way, the number of required shifting operations is again kept as small as possible. As pointed out above, in this case as well, the number of locations required for the rate matching process is equal to the final number of locations occupied by the matched composite frame MCF.

Of course, in the more general case in which the rate matching process makes provision for the reduction of bits from some coded digital words CWi and, at the same time, for the addition of bits to other coded digital words CWi of a same multiplexed digital word MW, the operations previously described are performed in combination (by following the puncturing algorithm when a coded digital word CWi has to be reduced, or following the repeating algorithm when a coded digital word CWi has to be increased).

Naturally, in order to satisfy local and specific requirements, a person skilled in the art may apply to the solution described above many modifications and alterations. Particularly, although the present invention has been described with a certain degree of particularity with reference to one or more embodiments thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, even if reference has been made to the UMTS, the concepts of the present invention are also applicable to transmissions following others telecommunication standards.

Similar considerations apply if the transmitter and/or the receiver devices have different structures (with the generator, encoding, processing or rate matching blocks structured in another way).

Likewise, the physical channel may be replaced by a plurality of physical channels, each one capable of conveying a corresponding matched composite frame.

Of course, it should be readily apparent that a single apparatus of the telecommunication system may include both the transmitter device and the receiver device described above.

Alternatively, each location may store a different digital symbol (for example, more bits in a multilevel memory).

Moreover, the puncturing, repeating, de-puncturing and de-repeating algorithms described above are not to be interpreted in a limitative manner.

The concepts of the present invention are also applicable when the shifting, inserting and removing operations are performed in different orders with respect to those described with reference to the enclosed drawings, which are to be intended as merely illustrative.

The same considerations are also applicable taking as a starting reference (for the operations of reducing/increasing the number of bits) the last bit of the coded digital words (instead of the first one).

More generally, different overlapping schemes of the memory areas storing the multiplexed digital word and the matched composite frame are not excluded.

Examples of systems including an integrated circuit having one or both of the transmitter 105 and receiver 110 include a cell phone, computer, and personal digital assistant (PDA).

From the foregoing it will be appreciated that, although specific embodiments of the invention have been described herein for purposes of illustration, various modifications may be made without deviating from the spirit and scope of the invention.

What is claimed is:

1. A telecommunication transmitter device including:
   means for providing a set of words, each word including a plurality of digital symbols;
   a first memory area for storing the set of words, the first memory area including a first sequence of memory locations each one for storing a symbol;
   a second memory area for storing a composite frame including a predetermined number of symbols, the second memory area including a second sequence of memory locations;
   conversion means for converting the set of words in the first memory area into the frame in the second memory area, the conversion means including reduction means for reducing each word by removing a set of symbols from the word according to a puncturing algorithm, and expansion means for expanding each word by adding a set of additional symbols to the word according to a repeating algorithm; and
   means for transmitting the frame,
   wherein the first memory area and the second memory area have at least one memory location in common.

2. A telecommunication receiver device including:
   means for receiving a composite frame including a predetermined number of symbols, the frame including a set of words each one consisting of a plurality of digital symbols;
   a first memory area for storing the frame, the first memory area including a first sequence of memory locations each one for storing a symbol;
   a second memory area for storing a set of converted words corresponding to said words, the second memory area including a second sequence of memory locations;
   conversion means for converting the set of words in the first memory area into the set of converted words in the second memory area, the conversion means including reduction means for reducing each word by removing a set of symbols from the word according to a puncturing algorithm, and expansion means for expanding each word by adding a set of additional symbols to the word according to a repeating algorithm; and
   means for outputting the set of converted words,
   wherein the first memory area and the second memory area have at least one memory location in common.

3. The device of claim 2, wherein the at least one memory location in common includes all the memory locations of one between the first and the second memory areas, and of the corresponding memory locations starting from a boundary of the other memory area.

4. The device of claim 3, wherein the reduction means includes means for shifting a first subset of the symbols of each word to overwrite at least partially a further first subset of the symbols of the word.

5. The device of claim 4, wherein the first subset includes the symbols of the word comprised between two symbols to be removed.

6. The device of claim 3, wherein the expansion means includes means for shifting a second subset of the symbols of each word to separate the second subset from a further second subset of the symbols of the word, and means for inserting at least one additional symbol between the second subset and the further second subset.

7. The device of claim 6, wherein the second subset and the further second subset are separated by a number of memory locations corresponding to the additional symbols to be inserted therebetween plus the additional symbols to be added in the further second subset.

8. The device of claim 1, wherein the set of words includes a plurality of words.

9. The device of claim 8, wherein the reduction means is adapted to act on each word individually, the conversion means further including means for compacting each pair of consecutive words including at least one compacted word by shifting a first word of the pair to make the first word adjacent to a second word of the pair.

10. The device of claim 8, wherein the expansion means is adapted to act on each word individually, the conversion means further including means for writing each further pair of consecutive words, including a further word to be expanded, into the second memory area separated by a number of locations corresponding to the additional symbols to be added to the further word.

11. A method for controlling a telecommunication transmitter, the method including the steps of:

providing a set of words, each word including a plurality of digital symbols;

storing the set of words into a first memory area, the first memory area including a first sequence of memory locations each one for storing a symbol;

converting the set of words in the first memory area into a composite frame including a predetermined number of symbols in a second memory area, the second memory area including a second sequence of memory locations, the step of converting including reducing at least one word by removing a set of symbols from the word according to a puncturing algorithm and/or expanding at least one word by adding a set of additional symbols to the word according to a repeating algorithm; and transmitting the frame, wherein the first memory area and the second memory area have at least one memory location in common.

12. A method for controlling a telecommunication receiver, the method including the steps of:

receiving a composite frame including a predetermined number of symbols, the frame including a set of words each one including a plurality of digital symbols;

storing the frame into a first memory area, the first memory area including a first sequence of memory locations each one for storing a symbol;

converting the set of words in the first memory area into a set of converted words in a second memory area, the second memory area including a second sequence of memory locations, the step of converting including reducing at least one word by removing a set of symbols from the word according to a puncturing algorithm, and/or expanding at least one word by adding a set of additional symbols to the word according to a repeating algorithm; and outputting the set of converted words, wherein the first memory area and the second memory area have at least one memory location in common.

* * * * *